Dec. 27, 1966   O. LUNDBERG   3,294,360
VALVE WITH RESILIENT DISC

Filed Feb. 15, 1963   2 Sheets-Sheet 1

INVENTOR
OLOF LUNDBERG

BY *Larson and Taylor*

ATTORNEYS

Dec. 27, 1966  O. LUNDBERG  3,294,360
VALVE WITH RESILIENT DISC
Filed Feb. 15, 1963  2 Sheets-Sheet 2

INVENTOR
OLOF LUNDBERG
BY *Larson and Taylor*
ATTORNEYS

United States Patent Office 3,294,360
Patented Dec. 27, 1966

3,294,360
VALVE WITH RESILIENT DISC
Olof Lundberg, Hagersten, Sweden, assignor to AGA-Platforadling Aktiebolag, Halsingborg, Sweden, a corporation of Sweden
Filed Feb. 15, 1963, Ser. No. 258,875
Claims priority, application Sweden, Feb. 23, 1962, 1,968/62
1 Claim. (Cl. 251—205)

The present invention refers to an arrangement in the kind of valves comprising a valve cone movable towards and away from a seat.

In many applications of valves, such as the control valves of the radiators of central heating systems, it is found to be very inconvenient that it has not been possible so far to construct a valve even approximating the linear control characteristic corresponding to ideal conditions at a manufacturing cost which would be reasonable in the circumstances. It is well known that in prior valves for this purpose, the flow resistance drops rapidly already during the first phase of the opening movement to the final value which is present when the valve is fully opened. In other words, substantially the entire control range of the valve is consumed during the very first portion of an opening movement or the very last phase of a closing movement, the variations in flow resistance which occur during the remaining portion of the control movement being so small that they are at any rate unable to cause any noticeable change in the temperature of the radiator. This applies not only to the cone type of valves but also to the plug type and all other constructions that have met the above-mentioned requirement for a reasonable production cost as well as the obvious requirement of dependability in operation and which have therefore been suitable for practical purposes.

The object of the invention is to provide a valve which is free from all the drawbacks referred to, i.e., the valve shall be simple and inexpensive to produce, be dependable in operation and have a control range corresponding substantially to the whole range of movement of the valve cone. This has been achieved according to the principal feature of the invention by arranging between the seat and the valve member a suitably disc-shaped member of resilient material, which is adapted when the valve is closed to be held against the resilient force by the valve member in position on the seat along the whole circumference thereof so as to cover the mouth of the seat in a tightening manner and the shape of which deviates in such a manner from a plane passing through the seating surface that upon opening of the valve the contact between the disc member and the seat is broken initially only along a portion of the circumference of the seat.

An embodiment of the invention is described in more detail below with reference to the accompanying drawing.

Figure 1:
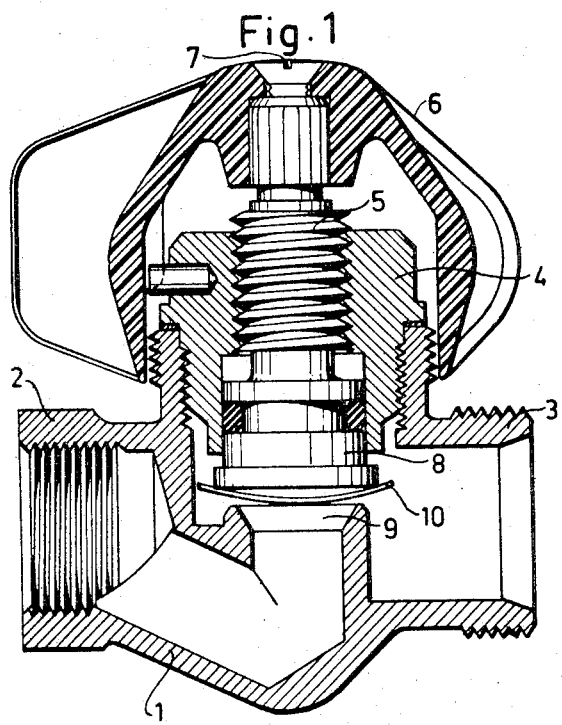
FIG. 1 is an axial section of a valve of a known type provided with an arrangement according to the invention.

In the drawing, 1 designates a valve housing provided with connection fittings 2 and 3 as well as a stem nut 4 holding the valve stem 5. The outer end of the latter is provided with a wheel 6 fastened by means of a central screw 7 and the inner end carries a valve member 8 cooperating with a valve seat 9. Thus far, the valve is of a priorly known type. It is apparent already from a glance at the drawing that such a valve has the inconvenient control characteristic referred to above.

Figure 2:
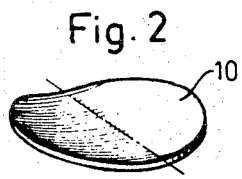
FIG. 2 shows a perspective view of a preferred embodiment of the disc member referred to above.

However, according to the invention there is arranged between the valve member 8 and the valve seat 9 a resilient member comprising in the embodiment shown a substantially circular metal disc 10, which may be of stainless steel of 0.15 mm. thickness. FIG. 2 shows that the disc is curved around a diameter. The arrangement operates as follows:

The valve is assumed to be entirely closed. The disc 10 is then held pressed to a substantially flattened shape between the valve member and the seat, so that the disc is in contact with the seat around the whole of its circumference. When the valve is then opened a little by a turning of the wheel and the elevation of the valve cone caused thereby, owing to the resiliency of the disc, it will first get out of contact with the seat along the portions of the circumference which are proximate to a diameter at right angles to the one referred to. As the opening movement proceeds, the flow passage increases successively owing to the fact that an increasing portion of the contact between the disc and the seat is removed until finally the disc is in contact with the seat substantially only at the two points on the diameter line of FIG. 2. If the valve member is further elevated, the disc will have no substantial influence on the flow of medium through the valve but the valve will then operate in principle in the same manner as if no disc had been present. It is however of advantage according to the invention to make this latter portion of the opening movement correspond at most to a very insignificant axial displacement of the valve member. The result therefore is that the flow resistance determined by the magnitude of the passage between the seat and the valve member or the lower rim of the disc 10 will change substantially and successively within almost the entire control range corresponding to the total movement of the valve member.

Figure 3:
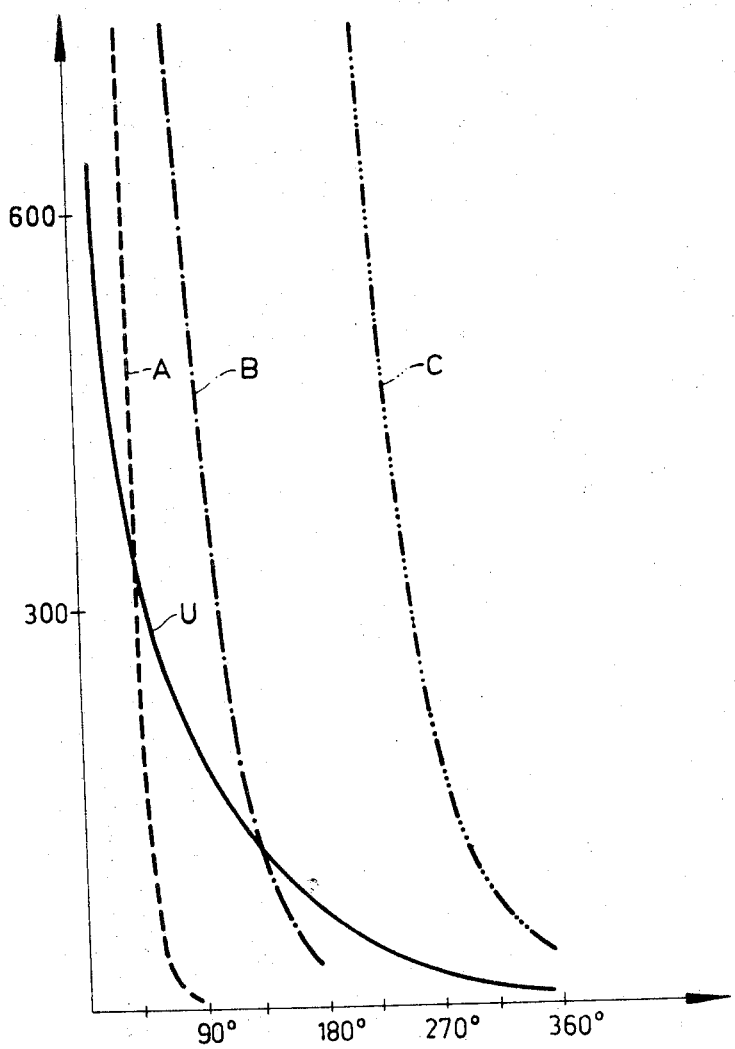
FIG. 3 is a family of curves illustrating the technical result achieved according to the invention.

The curves shown in FIG. 3 each represent the flow resistance of a valve as a function of the total control movement. The curves have been taken from tests and measurements on valves of different makes that are commercially available as well as on the valve of the present invention, the broken curves A, B and C applying to priorly known valves whereas the curve U applies to a valve according to the invention. The curves show convincingly the improvement in control characteristic obtained by the application of the invention. In the various cases, the final value of the flow resistance for the fully opened valve is somewhat different, which is due to wholly irrelevant differences relating to the constructive details of the valve housings. The essential factor is that each one of the curves A, B and C is of a very large slope within the major portion of its range, whereby the portion corresponding to the usable control range will be passed through during only a minor portion of the control movement of the valve, whereas in the valve of the present invention the flow resistance changes continuously within a range of at least 300°.

The above description and the accompanying drawing are intended only to illustrate the general concept of the invention. With regard to the purely constructive embodiments, a great number of modifications are therefore possible. Practical tests have shown that it is not normally required to attach the disc 10, since it is guided by the inner surface of the valve housing. This, of course, is a further advantage from the manufacturing point of view. As was indicated above, the disc may be of other than circular shape and it may also be curved in a different manner, the only thing of importance being that for the opened valve there is a dissymmetry with regard to the central axle of the valve seat and that the disc is of such a shape that it will make contact with the seat around the whole circumference thereof when the valve is closed and that, upon opening of the valve, the contact between the disc and the seat is not removed simultaneously around the whole circumference of the seat.

What is claimed is:

A valve comprising in combination with a valve member and an annular valve seat, said valve member being positioned in cooperation with said annular valve seat so as to limit the emergence of a fluid from said annular valve seat by being movable toward and away from said annular valve seat, a disc-shaped member positioned between said valve member and said annular valve seat, the diameter of the said valve member and the said disc-shaped member being at least as great as the diameter of the said annular valve seat, said disc-shaped member being curved about one of its diameters and of a resilient material, and said disc-shaped member being positioned between and cooperating with the relative movement of said valve member and said valve seat so as to regulate the quantity of fluid emerging from said valve seat to correspond with the distance of said valve member from said valve seat, and said disc-shaped member lying flat between said valve member and said valve seat when said valve is closed and curving away from said valve seat as said valve member moves away from said seat thereby increasing the flow of a fluid from said valve seat as the radius of curvature of said disc-shaped member is decreased.

References Cited by the Examiner

UNITED STATES PATENTS

| | | |
|---|---|---|
| 886,834 | 5/1908 | Michelin. |
| 1,890,126 | 12/1932 | Moore _____ 137—202 X |
| 1,940,007 | 12/1933 | Moore _____ 137—202 |
| 2,363,279 | 11/1944 | Anchicks. |
| 2,965,129 | 12/1960 | Faust. |
| 3,005,523 | 10/1961 | May _____ 137—525 X |

FOREIGN PATENTS

| | | |
|---|---|---|
| 204,897 | 12/1956 | Australia. |
| 822,148 | 10/1959 | Great Britain. |

ALAN COHAN, *Primary Examiner.*

ISADOR WEIL, WILLIAM F. O'DEA, *Examiners.*